United States Patent
Kapaun

(10) Patent No.: US 10,625,602 B2
(45) Date of Patent: Apr. 21, 2020

(54) FILLING DEVICE FOR A FLUID TANK

(71) Applicant: ILLINOIS TOOL WORKS INC., Glenview, IL (US)

(72) Inventor: Matthias Kapaun, Gaukoenigshofen (DE)

(73) Assignee: Illinois Tool Works Inc., Glenview, IL (US)

(*) Notice: Subject to any disclaimer, the term of this patent is extended or adjusted under 35 U.S.C. 154(b) by 28 days.

(21) Appl. No.: 15/503,905

(22) PCT Filed: Jun. 22, 2015

(86) PCT No.: PCT/US2015/036955
§ 371 (c)(1),
(2) Date: Feb. 14, 2017

(87) PCT Pub. No.: WO2016/028379
PCT Pub. Date: Feb. 25, 2016

(65) Prior Publication Data
US 2017/0274761 A1    Sep. 28, 2017

(30) Foreign Application Priority Data

Aug. 19, 2014  (DE) .................. 10 2014 111 834

(51) Int. Cl.
*B60K 15/04*   (2006.01)
*B65D 47/00*   (2006.01)

(52) U.S. Cl.
CPC ........ *B60K 15/04* (2013.01); *B60K 2015/047* (2013.01); *B60K 2015/0429* (2013.01);
(Continued)

(58) Field of Classification Search
CPC ............ B60K 15/04; B60K 2015/0429; B60K 2015/0461; B60K 2015/047; F01N 2610/1413
(Continued)

(56) References Cited

U.S. PATENT DOCUMENTS 6,691,750 B1 * 2/2004 Foltz ..................... B60K 15/04
                                                141/348
6,945,290 B1 * 9/2005 Benjey ............. B60K 15/03504
                                                141/302
(Continued)

FOREIGN PATENT DOCUMENTS

CN        101297146 A    10/2008
DE    102011120787 A1     1/2013
(Continued)

OTHER PUBLICATIONS

ISR & WO for PCTUS2015/036955 mailed Sep. 22, 2015.

*Primary Examiner* — J. Gregory Pickett
*Assistant Examiner* — Niki M Eloshway
(74) *Attorney, Agent, or Firm* — Quarles & Brady LLP

(57) ABSTRACT

A filling device for an operating fluid tank, comprising a tubular outer part and an inner part which is received in the outer part and which is designed to receive an operating fluid nozzle, is characterized in that the inner part comprises a first end wall having an opening and a second end wall having an opening, the end walls being connected to one another via a shell and the shell being provided over the entire length between the end walls with a shell opening whose width corresponds substantially to the corresponding maximum inner width of the shell.

20 Claims, 3 Drawing Sheets

(52) U.S. Cl.
CPC ............... *B60K 2015/0461* (2013.01); *F01N 2610/1413* (2013.01)

(58) Field of Classification Search
USPC .............................................. 220/86.2, 86.1
See application file for complete search history.

(56) References Cited

U.S. PATENT DOCUMENTS

| | | | | |
|---|---|---|---|---|
| 6,983,773 | B1* | 1/2006 | Hagano | B60K 15/04 141/348 |
| 2004/0083779 | A1* | 5/2004 | Foltz | B60K 15/04 70/159 |
| 2007/0018131 | A1 | 1/2007 | Bar | |
| 2008/0022732 | A1 | 1/2008 | McCarthy | |
| 2008/0277923 | A1 | 11/2008 | Brandt et al. | |
| 2011/0108563 | A1* | 5/2011 | Gerdes | B60K 15/04 220/810 |
| 2012/0024422 | A1 | 2/2012 | Cisternino | |
| 2012/0217240 | A1* | 8/2012 | Dutzi | B60K 15/0406 220/86.2 |
| 2014/0110405 | A1 | 4/2014 | Breuer et al. | |
| 2014/0183192 | A1 | 7/2014 | Aitken et al. | |
| 2015/0158379 | A1* | 6/2015 | Stancu | B60K 15/04 220/86.2 |
| 2015/0343897 | A1* | 12/2015 | Kito | B60K 15/04 220/86.1 |
| 2016/0009173 | A1* | 1/2016 | Sperando | B60K 15/04 220/86.2 |
| 2016/0031317 | A1* | 2/2016 | Giles | B60K 15/04 220/86.2 |
| 2016/0068063 | A1* | 3/2016 | Aso | B60K 15/04 220/86.2 |
| 2016/0121716 | A1* | 5/2016 | Aso | B60K 15/05 220/86.2 |

FOREIGN PATENT DOCUMENTS

| | | |
|---|---|---|
| EP | 1738949 A1 | 1/2007 |
| WO | 2010104661 A1 | 9/2010 |

\* cited by examiner

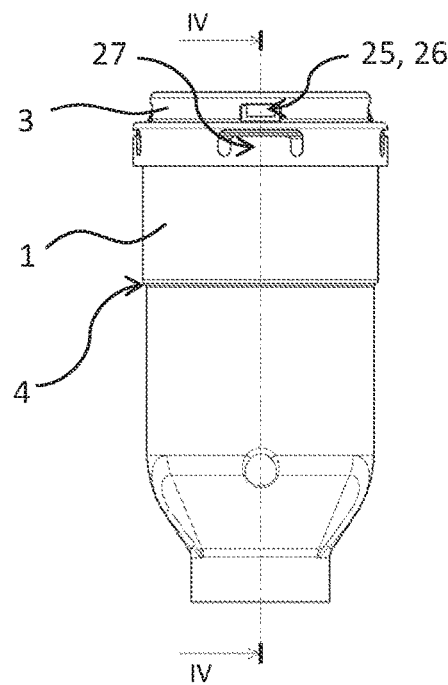
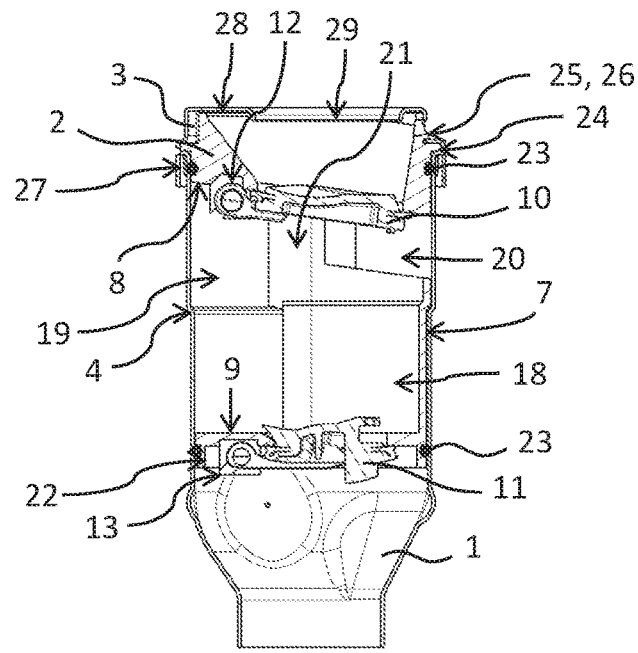
Fig. 2
Fig. 4
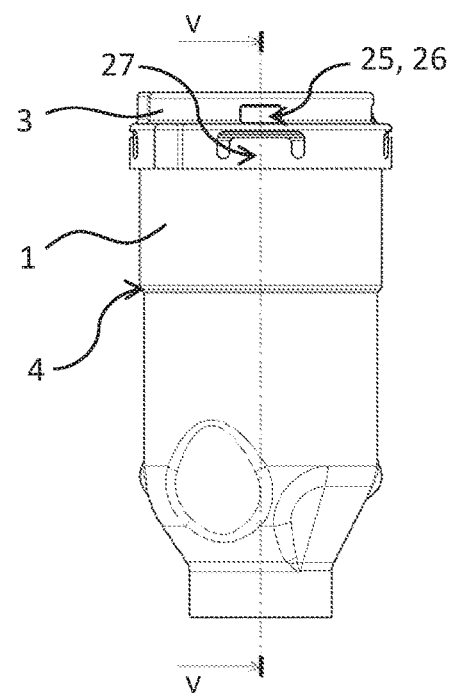
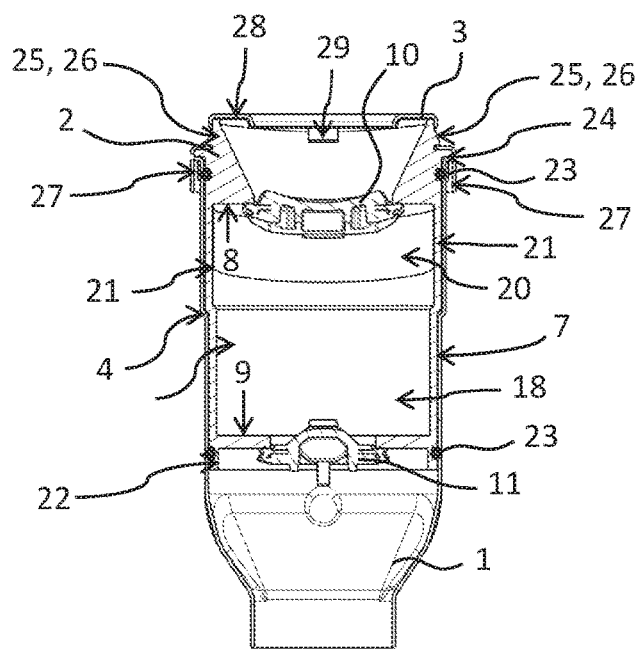
Fig. 3
Fig. 5

FILLING DEVICE FOR A FLUID TANK

RELATED APPLICATIONS

The present application is a National Phase of International Application Number PCT/US2015/036955 filed Jun. 22, 2015, and claims priority from German Application Number 10 2014 111 834.0 filed Aug. 19, 2014.

The invention relates to a filling device for an operating fluid tank, in particular a fuel or AdBlue® tank, comprising a tubular outer part and an inner part which is received in the outer part and which is designed to receive an operating fluid nozzle. The invention particularly relates to such a filling device in which there is arranged inside the inner part at least one closure flap which is urged, in particular under spring loading, into a closure position closing an opening, the closure flap being pivotable from the closure position into an opening position at least partially releasing the opening by inserting the operating fluid nozzle into the inner part.

Such a filling device for an operating fluid tank of, for example, a motor vehicle (for example a car or truck) is also referred to as "capless" since the closure flap, which is opened by means of the operating fluid nozzle itself and which closes again automatically, makes it possible to dispense with a cap to be released or to be fastened manually. Whereas the outer part of such a filling device serves on the one hand for integration into the body structure of the motor vehicle and on the other hand for fluid-conducting attachment to the operating fluid tank, the inner part ensures in particular that the inserted part of the operating fluid nozzle is guided and held with little play.

The known filling devices, in particular those which are designed as "capless", are comparatively complicated to produce since they consist of a relatively large number of components which have not only to be produced individually but also have to be connected to one another during assembly, it being necessary at the same time to ensure fluidtightness between the outer part and the inner part in order to prevent operating fluid and gases from escaping.

It was the object of the invention to specify a filling device for an operating fluid tank that can be produced as simply as possible and thus cost-effectively.

This object is achieved by means of a filling device as claimed in patent claim 1. Advantageous refinements thereof are claimed in the further patent claims and will become apparent from the following description of the invention.

A generic filling device for an operating fluid tank that comprises at least one tubular outer part and an inner part which is received in the outer part and which is designed to receive an operating fluid nozzle is characterized according to the invention in that the inner part has a first end wall having an opening and a second end wall having an opening, the end walls being connected to one another via a shell and the shell being provided over the entire length between the end walls with at least one shell opening whose width corresponds substantially to the corresponding maximum inner width of the shell.

"Corresponding" inner width is understood as meaning that inner width which lies in or parallel to the plane defined by the edges of the shell openings.

Here, it is not required that the individual shell opening(s) extends/extend over the entire length between the end walls; rather, it is also possible for a plurality of shell openings to be provided which are arranged in such a way that the shell is provided in each portion between the end walls with at least one portion of such a shell opening.

In principle, the orientation of the first and/or second end wall relative to a longitudinal axis of the shell can be selected as desired. In particular, the first and/or second end wall can be oriented perpendicularly, virtually perpendicularly or obliquely with an angle of for example at most 45° with respect to this longitudinal axis.

The configuration according to the invention of the inner part makes it possible for at least the shell, in particular the shell together with the end walls and particularly preferably the entire inner part to be formed in one piece. Here, this inner part can be formed in particular as a casting and particularly preferably as a plastic injection molding since the shell opening(s) allows/allow demolding in a radial direction (with respect to a longitudinal axis of the filling device). Here, it is possible, where appropriate, for even a merely two-part mold to be used. Particularly when producing the entire inner part as a one-piece casting, the total number of the components to be produced and assembled to form the filling device is reduced by comparison with the known filling devices. Moreover, production of the inner part as a plastic injection molding can be implemented in an extremely cost-effective manner at least in large-series production.

According to the invention, it may also be possible in principle for the width of the shell opening(s) to be slightly smaller than the corresponding maximum inner width of the shell, with the result that, with respect to a radial demolding direction, small undercuts can be formed. This applies as long as furthermore demolding of the inner part is possible owing to an elastic deformation of the inner part. This "tolerance range" with respect to the width of the shell opening(s) in comparison to the corresponding maximum inner width of the shell is intended to be covered by the expression "substantially".

The filling device according to the invention can preferably be a "capless" filling device. Accordingly, it can preferably be provided that there is arranged inside the inner part at least one closure flap which is urged (preferably under spring loading) into a closure position closing an opening of the inner part, the closure flap being pivotable from the closure position into an opening position at least partially releasing the opening by inserting the operating fluid nozzle into the inner part.

In a preferred refinement of the filling device according to the invention, there can be provided a first closure flap by means of which the opening of the first end wall can be closed, and a second closure flap by means of which the opening of the second end wall can be closed. Here, it can be particularly preferably provided that each of these closure flaps is urged (in particular under spring loading) into a closure position, while these flaps can be moved in each case from the closure position into an opening position by inserting the operating fluid nozzle into the inner part of the filling device. A high operational reliability for the filling device can be achieved by means of at least two closure flaps which, in their closure positions, in each case prevent a return flow of operating fluid from the operating fluid tank into the surroundings.

The closure flap(s) can be integrated into the inner part in a sealed or nonsealed manner, with the result that this flap, in the closure position, prevents to the largest possible extent an overflow of even small amounts of operating fluid and, where appropriate, gases. For this purpose, the closure flap(s) and/or the inner part may comprise a sealing element by means of which a gap formed between the inner part and the closure flap in its closure position is sealed.

In order to be able to prevent operating fluid and, where appropriate, gases from escaping through an intermediate space formed between the outer part and the inner part, it can furthermore preferably be provided that at least one sealing element arranged outside the shell with respect to the longitudinal orientation of the filling device is provided. Such sealing between the outer part and the inner part can be achieved in a constructionally simple manner by virtue of the fact that the sealing element is designed as a sealing ring (for example an O-ring or profiled sealing ring) which is furthermore preferably arranged for positional securement in a circumferential groove of the inner part and/or of the outer part. However, integration of the sealing element can also be achieved by means of a 2-component production process (in particular 2-component injection molding). If only one sealing element is to be provided, this should advantageously be arranged on that side of the inner part (outside the shell) from which the nozzle is inserted into the inner part or the filling device. Consequently, a single sealing element makes it possible to prevent not only a return flow of operating fluid from the operating fluid tank but also of operating fluid which, in the case of a not fully inserted operating fluid nozzle, emerges in the region of the shell of the inner part and can flow via the shell opening(s) into the intermediate space between the inner part and the outer part. Should only one closure flap for the filling device according to the invention be provided in such a configuration, this flap should advantageously allow a closure as required of the opening of that end wall which is situated closer to that end of the filling device from which the operating fluid nozzle is inserted.

However, at least two sealing elements are preferably provided, of which in each case at least one is arranged outside the shell (with respect to the longitudinal orientation of the filling device) on each side.

In a further preferred refinement of the filling device according to the invention, it can additionally be provided that the first end wall is part of a first end wall portion of the inner part and/or the second end wall is part of a second end wall portion of the inner part, the first end wall portion and/or the second end wall portion bearing (in each case) fully circumferentially (directly or indirectly) on the inner side of the outer part in a bearing portion. As a result, a bearing of the inner part inside the outer part that is as play-free as possible and can be loaded by the operating fluid nozzle is achieved. Here, it can particularly preferably be provided that a provided sealing element is arranged in the associated bearing portion.

It can further preferably be provided that the outer part is designed to be fully circumferentially closed at least in the portion extending between the bearing portions of the first end wall portion and of the second end wall portion. This is expedient because of the configuration according to the invention of the shell of the inner part which is provided over the entire length between the end walls with a shell opening, in order to achieve fluidtightness to the outside for the filling device.

In a further preferred refinement of the filling device according to the invention, it can be provided that the opening of the first end wall widens in the direction of the, and in particular up to the, end of the inner part that is formed by the first end wall portion. This can be in particular that end of the inner part from which the operating fluid nozzle can be inserted into the filling device. The widening or tapering (with respect to the insertion direction for the operating fluid nozzle) design of the opening of the first end wall portion can in particular facilitate the insertion of the operating fluid nozzle in that the front end of the operating fluid nozzle is centered with respect to at least the opening formed by the first end wall.

It can further preferably be provided that the second end wall portion is formed, on the side facing away from the shell, with a peripheral projection at the edge. This makes it possible in particular to increase the radial stiffness for the inner part and additionally to create space for the integration of a sealing element.

The widening design of the opening of the first end wall portion and the provision of a peripheral edge projection on the second end wall portion can lead to the formation of undercuts with respect to a radial demolding direction for the inner part formed as a casting and in particular as an injection molding. Nevertheless, such an inner part of a filling device according to the invention can also be readily produced by mold casting and in particular injection molding if a preferably at least four-part mold is used in which two central mold parts, which are provided to form (at least) the shell, are moved apart for demolding in the corresponding radial direction, whereas two end mold parts, by means of which (at least) the sides of the end wall portion that face away from the shell are formed, are moved apart for demolding in the axial direction.

In order to achieve in a constructionally simple manner an opening of a closure flap, which is provided for closing as required the opening formed by the first end wall, by inserting the operating fluid nozzle, the first end wall can form a rotary bearing for the closure flap on the side facing the shell. Since this rotary bearing can constitute an undercut with respect to a radial demolding direction, it can particularly preferably be provided that the shell has two radially opposite shell openings in the portion surrounding this rotary bearing. Thus, it is also possible for such an inner part of the filling device according to the invention to be produced using a merely two-part mold (for forming the shell).

For a closure flap by means of which the opening formed by the second end wall can be closed as required, such a rotary bearing can preferably be arranged on the side of the second end wall that faces away from the shell. As a result, this rotary bearing is not arranged between the end walls and thus in the region of the shell. Therefore, special provisions for demolding in a radial direction do not have to be made owing to such a rotary bearing. However, this rotary bearing is then preferably designed such that it forms no or only as few as possible and/or small undercuts with respect to an axial demolding direction.

In a preferred refinement of the filling device according to the invention, it can be provided that the rotary bearing of the first end wall and/or the rotary bearing of the second end wall are designed in such a way that the associated closure flap can be mounted and/or demounted only in an orientation which it does not assume during a pivoting movement between the closure position and the opening position. Such mounting can be achieved in particular by means of a radial (with respect to an axis of rotation for the closure flap) insertion of the closure flap into the rotary bearing by corresponding mounting slots. Such a configuration of the filling device according to the invention can make it possible to form both the rotary bearing and the associated closure flap in one piece. Moreover, particularly simple mounting can be achieved. Unwanted release of the closure flap can be prevented in that it can be released in only this one orientation from the rotary bearing which it does not assume during an intended use of the filling device. However, there is also the possibility of mounting the closure flap by means of a separate pin which can be inserted in particular in its longitudinally axial direction into the corresponding rotary bearing.

In order to achieve axial securement of the inner part inside the outer part, it can be provided that the inner part, in particular with the end forming the second end wall, bears axially against a stop of the outer part. Here, the stop can be formed for example as an indentation incorporated into the wall of the outer part.

Alternatively or in addition, it can also be provided that the inner part, in particular at the end comprising the first end wall, forms a stop against which the outer part and in particular an end of the outer part bears axially. Both possibilities for axial securement can be achieved in a particularly simple manner and do not require any significant mounting effort.

A sleeve which fixes the outer part and the inner part to one another can further preferably be provided. Such a sleeve can be used in particular in combination with a corresponding stop between the inner part and the outer part, the stop preventing a relative movement between the inner part and the outer part in a direction leading in the longitudinal orientation of the filling device, and the sleeve preventing such a relative movement in the direction opposite thereto. In principle, however, the sleeve can also be designed in such a way that it prevents a relative movement in both directions leading along the longitudinal orientation. Particularly for simplifying the assembly of the filling device according to the invention, it can also be provided that the sleeve can be pushed onto that end of the inner part comprising the first end wall, a latching connection between the inner part and the sleeve being formed by pushing on the sleeve in this way.

Moreover, it can be provided that a positive and/or a nonpositive connection between the sleeve and the outer part can be produced by bending over a tab formed by the sleeve (for example of metal or plastic) or the outer part. This bending-over of the tab can be provided in a reversible or nonreversible manner.

The filling device according to the invention can have a misfuel inhibitor (MFI) known per se. The element which inhibits misfueling can be arranged outside or inside the shell of the inner part.

Furthermore, the filling device according to the invention can be designed to receive specific operating fluid nozzles for tapping for example diesel fuel, gasoline fuel or urea-water solution, also known as AdBlue.

Moreover, a venting valve can be integrated into the filling device according to the invention and in particular the inner part thereof.

The indefinite articles ("a" and "an"), in particular in the patent claims and in the above description which gives a general explanation of the patent claims, are to be understood as such and not as numerals. Components correspondingly specified thereby are thus to be understood as being present at least once, it being possible for them to be present multiple times.

The invention will be explained in more detail below with reference to an exemplary embodiment illustrated in the drawings, in which:

FIG. 2 shows the filling device in a first side view;

FIG. 3 shows the filling device in a second side view;

FIG. 4 shows a longitudinal section through the filling device along the section plane IV-IV in FIG. 2;

FIG. 5 shows a longitudinal section through the filling device along the section plane V-V in FIG. 3;

Figure 1:
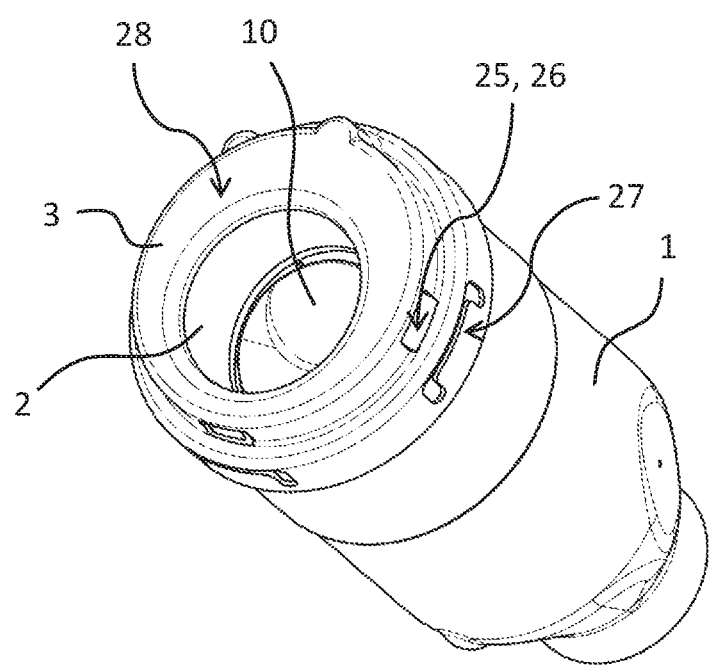
FIG. 1 shows a filling device according to the invention in a perspective illustration.
Figure 6:
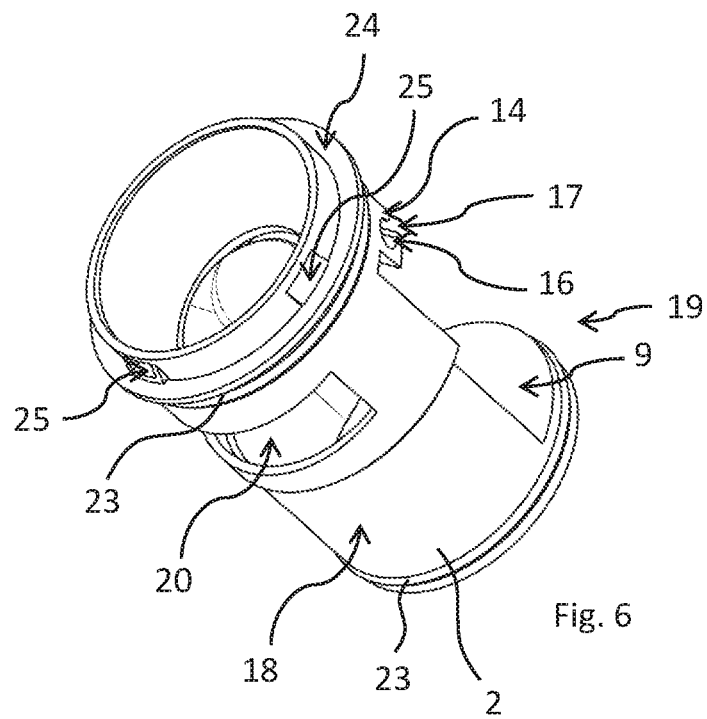
FIG. 6 shows the inner part of the filling device in a perspective illustration.

The filling device illustrated in the drawings comprises an outer part 1, an inner part 2 and a sleeve 3 used to connect the outer part 1 to the inner part 2.

The outer part 1 is designed as a one-part, fully circumferentially closed tube, for example of metal and in particular steel or of a plastic, with a substantially uniform wall thickness and substantially circular ring-shaped cross section. Starting from a first end of the outer part from which an operating fluid nozzle (not shown) can be inserted into the filling device, the outer part has a receiving portion, a transition portion and a connection portion.

The inner part 2 is arranged inside the outer part 1 in the region of the receiving portion. The outer part 1 has the largest (inside and outside) diameter in this receiving portion. A small change in diameter in the form of a peripheral shoulder 4 is provided only approximately at the center of the receiving portion. This change of diameter, which is also provided on the outside of the inner part 2, serves inter alia for axially securing the inner part 2 inside the outer part 1.

In the transition portion, the diameter of the outer part 1 is reduced starting from the diameter of the receiving portion down to the considerably smaller diameter of the connection portion.

The comparatively short connection portion has a constant diameter and serves for connection to an operating fluid pipe (not shown) which connects the filling device to an operating fluid tank (not shown).

The inner part 2 is designed as a one-piece plastic injection molding. It comprises a first end wall portion 5 and a second end wall portion 6 and a shell 7 which connects the two end wall portions 5, 6 to one another. Each of the end wall portions 5, 6 forms a (first or second) end wall 8, 9, with in each case an opening being provided inside the end walls 8, 9. The openings of both end walls 8, 9 can be closed by means of in each case a closure flap 10, 11, the two closure flaps 10, 11 being urged by means of in each case a spring element (not shown) into a closure position in which they substantially completely close the respective openings (cf. in particular FIGS. 4 and 5). The closure flaps 10, 11, which can for example likewise be formed in one piece as plastic injection moldings, can be pivoted out of these closure positions, with the result that said flaps can be moved into opening positions. Such a pivoting movement of the closure flaps 10, 11 is produced by inserting the operating fluid nozzle and is enabled by virtue of the fact that the first end wall 8 has a first rotary bearing 12 on the side facing the shell 7 and the second end wall 9 has a second rotary bearing 13 on the side facing away from the shell 7.

The rotary bearings 12, 13 are in each case based on two spaced-apart shoulders 14 which project from the respective end wall 8, 9 and which in each case form a through-opening 16 with a circular cross section (cf. in particular FIG. 7), the through-openings 16 of the in each case two shoulders 14 forming a rotary bearing 12, 13 being oriented coaxially to one another. As a result, they define the axis of rotation for the associated closure flap 10, 11. The closure flaps 10, 11 form in each case two pivot pins 15 which are likewise arranged in a coaxial orientation to one another and which have a cross section which is based on a circular shape (with an outside diameter which virtually corresponds to the inside diameter of the associated through-opening 16), but has two parallel flat portions (cf. FIG. 7). The radial spacing between these flat portions virtually corresponds to the width of mounting slots 17 which are provided in all the shoulders 14 and in each case extend in a radial direction with respect to the corresponding axes of rotation or through-openings 16. As a result, the pivot pins 15 of the closure flaps 10, 11 can be inserted via the mounting slots 17 into the through-openings 16 in an orientation in which the flat portions are oriented parallel to the inner sides of the mounting slots 17. It is provided that the corresponding orientation of the closure flaps 10, 11 is not achieved during an intended use of the filling device and, in order to achieve these orientations starting from the respective closure position, the closure flaps 10, 11 must be pivoted further than occurs by inserting the operating fluid nozzle into the filling device. As a result, unwanted release of the closure flaps 10, 11 from the rotary bearings 12, 13 can be avoided.

The shell 7 is formed in one portion from a tubular shell part 18. This results in a first, relatively large shell opening 19 extending over the entire length between the two end wall portions 5, 6. The depth of the tubular shell part 18 is only slightly larger than the corresponding radius, resulting in a width for the first shell opening 19 that corresponds substantially to the corresponding maximum inner width of the shell 7. The shell 7 can thus be produced in a two-part (part) mold, with demolding occurring by moving apart the mold parts in a radial direction which is arranged approximately perpendicularly to the planes defined by the edges of the tubular shell parts 18.

If the tubular shell part 18 were to extend over the entire length between the two end wall portions 5, 6, the rotary bearing 12 formed by the first end wall 8 would constitute an undercut with respect to this demolding direction. In order to avoid this, the shell 7 has a second shell opening 20 in a portion adjoining the first end wall 8, with the result that the shell 7 is reduced in this portion to two diagonally opposite webs 21 extending approximately in parallel. As a result, that mold part which forms the part of the shell 7 comprising the outer side of the tubular shell part 18 can extend up to the rotary bearing 12 formed by the first end wall 8. Thus, with regard to the intended demolding direction, only the through-openings 16 and the mounting slots 17 of the first rotary bearing 12 constitute undercuts. However, they can be produced in a simple manner by integrating one or more slides in the mold without demolding being impeded thereby.

Figure 7:
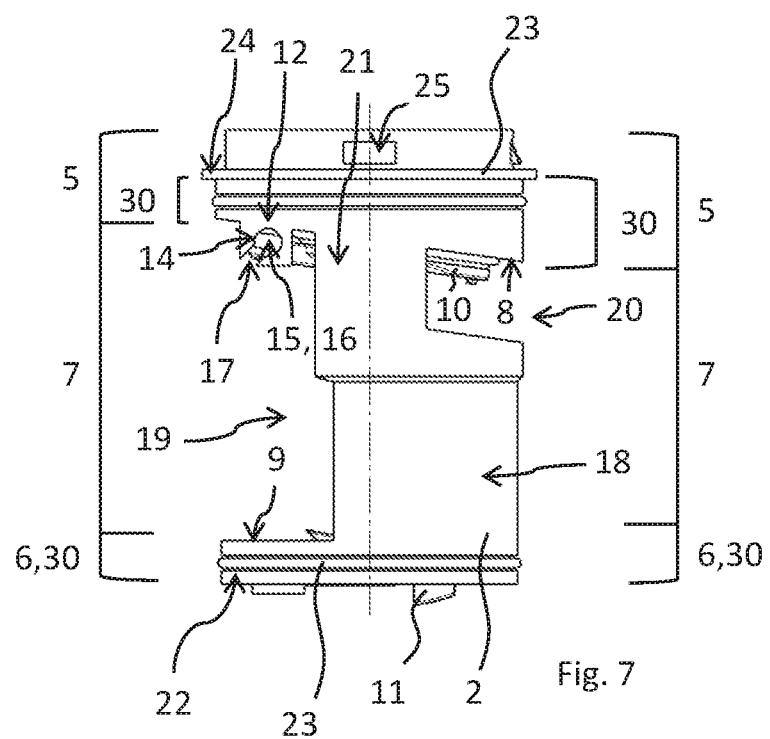
FIG. 7 shows the inner part in a first side view.

As is evident in particular from FIGS. 4, 5 and 7, the opening of the first end wall 8 widens in the direction of that end of the inner part 2 formed by the first end wall portion 5. With respect to an insertion direction for the operating fluid nozzle, a funnel-shaped tapering is thus obtained, with the result that the front end of the operating fluid nozzle is centered with respect to the openings in the two end walls 8, 9 and consequently insertion of the operating fluid nozzle is simplified.

The second end wall portion 6 forms, on the side of the second end wall 9 that faces away from the shell 7, a peripheral projection 22 at the edge. By virtue of this projection 22, the axial length of the second end wall portion 6, which bears over its entire length fully circumferentially on the inner side of the outer part 1 (and as a result constitutes a corresponding bearing portion 30 over the entire length), is advantageously extended, thereby improving the integration of a sealing element 23 in the form of an O-ring which is arranged in a peripheral groove which is integrated into the second end wall portion 6 on the outside.

A corresponding integration of a sealing element 23 taking the form of an O-ring is also provided in a bearing portion 30 of the first end wall portion 5. This bearing portion, in which the inner part 2 likewise bears fully circumferentially on the inner side of the outer part 1, extends from the shell 7 to a peripheral shoulder 24 of the inner part 2 that acts as a stop by means of which insertion of the inner part 2 into the outer part 1 is limited in that the corresponding end of the outer part 1 butts axially thereon.

With respect to that direction in which the inner part 2 can be inserted into the outer part 1, a relative movement between the inner part 2 and the outer part 1 is limited by the peripheral shoulder 24 and also by the shoulder 4 of the outer part 1 and the corresponding shoulder of the shell 7. A relative movement of the inner part 2 and of the outer part 1 with respect to one another in the direction opposite thereto, i.e. a release of the inner part 2 and of the outer part 1 from one another, is prevented by the sleeve 3 which can be plugged onto the inner part 2 and the outer part 1 from the first end of the filling device. Here, a plurality of latching connections are formed between the inner part 2 and the sleeve 3 such that the sleeve 3 is pushed, with temporary elastic widening, onto wedge-shaped locking projections 25 until the locking projections 25 engage in corresponding locking openings 26 of the sleeve 3. A nonpositive and positive connection between the sleeve 3, which consists of metal and in particular steel and is thereby readily plastically deformable, and the outer part 1 is achieved by a plurality of tabs 27 of the sleeve 3 which, for this purpose, are bent over in the direction of the outer part 1 during the assembly of the filling device, with the result that they press against the outer part 1 and, with respect to the longitudinal orientation of the filling device, engage behind the outwardly bent-over end of the outer part 1 (cf. FIGS. 4 and 5).

The two end wall portions 5, 6 of the inner part 2 with the openings and depressions running in the longitudinal axial direction constitute undercuts with respect to the radial demolding direction which is provided for producing the shell 7. It is therefore provided to produce the one-piece inner part 2 in an in total four-part mold (where appropriate with additional slides in one or more of the mold parts), with two central mold parts being moved apart for demolding in a radial direction (with respect to the inner part 2), whereas two end mold parts are moved apart (from one another and from the central mold parts) in a longitudinal axial direction (with respect to the inner part 2).

The sleeve 3 likewise forms an end wall 28 with an opening 29, the opening 29 of the sleeve 3 being oriented approximately concentrically to the openings of the end walls 8, 9 of the inner part 2.

The invention claimed is:
1. A filling device for an operating fluid tank, comprising: a tubular outer party; and
an inner part which is received in the outer part and which is designed to receive an operating fluid nozzle, wherein the inner part comprises a first end wall having an opening and a second end wall having an opening, the end walls being connected to one another via a shell and the shell being provided over the entire length between the end walls with at least one shell opening whose width corresponds substantially to the corresponding maximum inner width of the shell, wherein a second shell opening is provided in a portion joining the first end wall, such that the shell is reduced in this portion to two diagonally opposite webs extending approximately in parallel.
2. The filling device as claimed in claim 1, wherein the inner part is formed in one piece.

3. The filling device as claimed in claim 1, wherein there is arranged inside the inner part at least one closure flap which is urged into a closure position closing an opening, the closure flap being designed in such a way that it can be pivoted from the closure position into an opening position at least partially releasing the opening by inserting the operating fluid nozzle into the inner part.

4. The filling device as claimed in claim 3, comprising a first closure flap by means of which the opening of the first end wall can be closed, and a second closure flap by means of which the opening of the second end wall can be closed.

5. The filling device as claimed in claim 1, comprising at least one sealing element arranged outside the shell with respect to a longitudinal orientation of the filling device.

6. The filling device as claimed in claim 5, wherein the sealing element is arranged in an associated bearing portion.

7. The filling device as claimed in claim 1, wherein the first end wall is part of a first end wall portion of the inner part and/or the second end wall is part of a second end wall portion of the inner part, the first end wall portion and/or the second end wall portion bearing fully circumferentially on the inner side of the outer part in a bearing portion.

8. The filling device as claimed in claim 7, wherein the outer part is designed to be fully circumferentially closed at least in the portion extending between the bearing portions of the first end wall portion and of the second end wall portion.

9. The filling device as claimed in claim 7, wherein the opening of the first end wall widens in the direction of the end of the inner part that is formed by the first end wall portion, and/or the second end wall has, on the side facing away from the shell, a peripheral projection at the edge.

10. The filling device as claimed in claim 1, wherein the first end wall forms a rotary bearing for the closure flap on the side facing the shell, and/or the second end wall forms a rotary bearing for the closure flap on the side facing away from the shell.

11. The filling device as claimed in claim 10, wherein the rotary bearing of the first end wall and/or the rotary bearing of the second end wall are designed in such a way that the associated closure flap can be mounted and/or demounted only in an orientation which it does not assume during a pivoting movement between the closure position and the opening position.

12. The filling device as claimed in claim 1, wherein the inner part forms a stop on the end comprising the first end wall against which stop the outer part bears axially.

13. The filling device as claimed in claim 1, comprising a sleeve which fixes the outer part and the inner part to one another.

14. The filling device as claimed in claim 13, wherein the sleeve can be pushed onto that end of the inner part forming the first end wall, a latching connection between the inner part and the sleeve being formed by pushing on the sleeve in this way.

15. The filling device as claimed in claim 13, wherein a positive and/or a non-positive connection between the sleeve and the outer part can be produced by bending over a tab formed by the sleeve or the outer part.

16. A filling device for an operating fluid tank, comprising: a tubular outer part; and
an inner part which is received in the outer part such that the outer part extends beyond a rear end of the inner part and which is designed to receive an operating fluid nozzle, wherein the inner part comprises a first end having a first end wall with an opening and a second end having a second end wall with an opening, the ends being connected to one another via a shell and the shell being provided over the entire length between the ends with at least one shell opening whose width corresponds substantially to the corresponding maximum inner width of the shell, and
wherein a cross-section of the inner part has two sections of rectangular shape with maximum inner diameters that are normal to a longitudinal axis of the inner part that are respectively constant over the sections, which sections make up almost the entire space between the end walls.

17. The filling device of claim 16, wherein the inner part is a monolithic component that extends from beyond a front beginning of the outer part to a location proximate a beginning of a constriction of the outer part opposite the front beginning.

18. The filling device of claim 16, wherein a cross-section of the inner part has maximum inner diameters that are normal to a longitudinal axis of the inner part that are about the same from one wall to the other wall.

19. The filling device of claim 16, wherein the inner part is a monolithic component such that the walls have faces that directly face one another in a parallel manner.

20. A filling device for an operating fluid tank, comprising:
a tubular outer part, and
an inner part which is received in the outer part and which is designed to receive an operating fluid nozzle, wherein the inner part comprises a first end wall having an opening and a second end wall having an opening, the end walls being connected to one another via a shell and the shell being provided over the entire length between the end walls with at least one shell opening whose width corresponds substantially to the corresponding maximum inner width of the shell,
wherein the first end wall forms a rotary bearing for the closure flap on the side facing the shell, and/or the second end wall forms a rotary bearing for the closure flap on the side facing away from the shell, and
wherein the rotary bearing of the first end wall and/or the rotary bearing of the second end wall are designed in such a way that the associated closure flap can be mounted and/or demounted only in an orientation which it does not assume during a pivoting movement between the closure position and the opening position.

* * * * *